T. H. REED.
AUTOMOBILE WIND SHIELD SHADE.
APPLICATION FILED APR. 29, 1918.
1,285,379.
Patented Nov. 19, 1918.
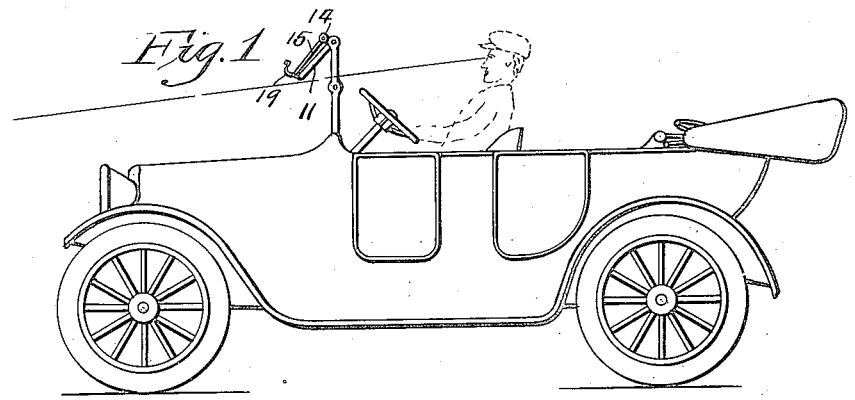
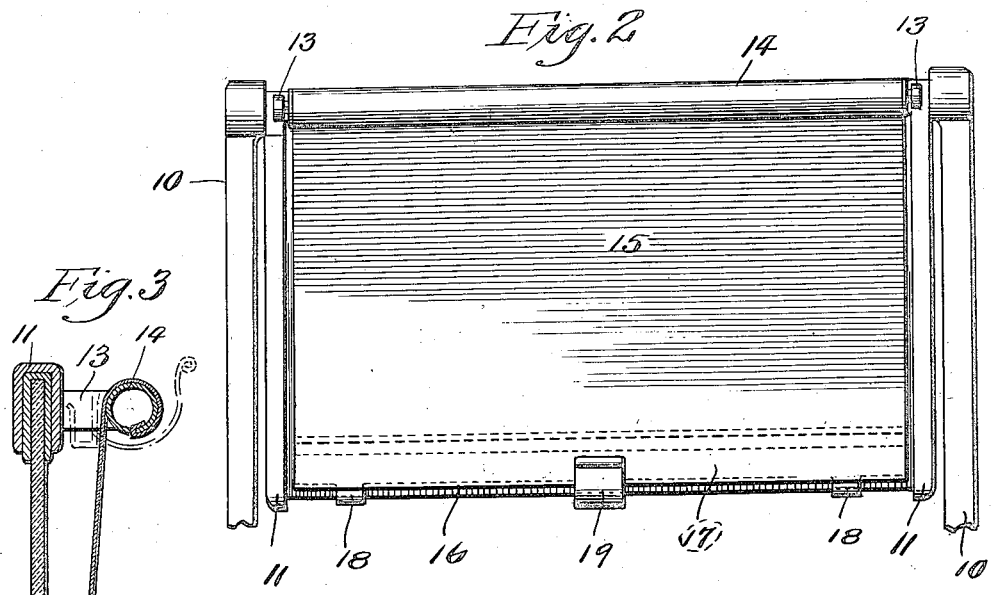
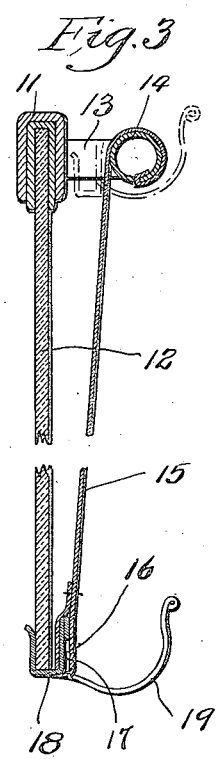
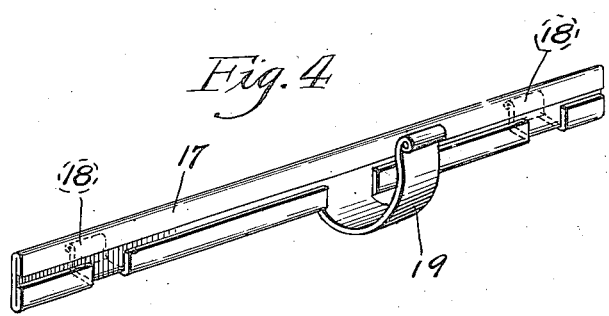
Inventor
Thomas H. Reed

UNITED STATES PATENT OFFICE.

THOMAS H. REED, OF CLAYTON, MISSOURI.

AUTOMOBILE-WIND-SHIELD SHADE.

1,285,379.

Specification of Letters Patent.

Patented Nov. 19, 1918.

Application filed April 29, 1918. Serial No. 231,407.

*To all whom it may concern:*

Be it known that I, THOMAS H. REED, a citizen of the United States, residing at Clayton, Missouri, have invented a certain new and useful Improvement in Automobile-Wind-Shield Shades, of which the following is a full, clear, and exact description, such as will enable others skilled in the art to which it appertains to make and use the same, reference being had to the accompanying drawings, forming part of this specification.

My invention relates to a shade or screen particularly applicable for the wind shields of automobiles, the principal object of my invention being to provide a relatively simple device which can be easily and quickly adjusted so as to cut off or shade from the eyes of the car driver, the direct rays from the sun while the latter is relatively low or near the horizon, and said device being likewise effective at night in shading the driver's eyes from rays and glare of headlights carried by approaching vehicles.

Further objects of my invention are, to provide a shade which can be readily applied to practically all forms of automobile wind shields now in general use, and said shade capable of being easily and quickly shifted from a position of service into an out-of-the-way position and vice versa.

A still further object of my invention is to provide the lower edge of the shade with a one-piece metal strip, the same being provided with integrally formed hooks, certain of which are adapted to engage the lower edge of the wind shield to which the shade is applied and another one of said hooks being adapted to perform the functions of a handle in manipulating the shade and also to serve as a hook to engage the shade roller and retain the shade in its rolled-up position.

With the foregoing and other objects in view, my invention consists in certain novel features of construction and arrangement of parts, hereinafter more fully described and claimed, and illustrated in the accompanying drawings, in which—

Figure 1 is an elevational view of an untomobile, the wind shield of which is equipped with a shade of my improved construction.

Fig. 2 is a front elevational view of the shade.

Fig. 3 is an enlarged vertical section taken approximately through the center of a wind shield, the same being equipped with my improved shade.

Fig. 4 is a perspective view of the metal strip which is carried by the lower edge of the shade.

Referring by numerals to the accompanying drawings which illustrate a practical embodiment of my invention, 10 designates the upright members which serve as supports for the wind shield, the latter, it being understood, comprising two or more hinged frames carrying sections of plate glass or the like.

A form of wind shield now in general use comprises three hinged glass carrying frames, one of which is hinged at its upper outer corners to the upper ends of the posts or uprights 10. This portion of the shade is adapted to swing outward into the position illustrated in Fig. 1, to serve as a storm shield, that is, to prevent rain, snow and the like from striking against and lodging upon the surface of the glass carried by the frame which is vertically disposed between the upper portions of uprights 10. My improved shade is intended to be applied to this so-called storm shield, which latter comprises a suitable frame 11, preferably of metal, and said frame carrying a section 12 of plate glass or the like.

Applied in any suitable manner to the upright corners of the frame 11 and on the outer face thereof are brackets 13 which are adapted to receive the pintles of an ordinary spring-actuated shade roller 14, preferably of the Hartshorne type. Secured to this roller and adapted to wind thereupon is a shade 15 of suitable flexible material, preferably water-proof. The lower edge of the shade body is provided with a relatively wide hem 16 made by folding the material double and arranged within this hem is a relatively thin strip or rail 17 of metal. I prefer to form this strip or rail of a section of thin sheet metal such as tin, the upper and lower edges thereof being bent over so as to lie directly upon the central portion of the section of metal, thereby forming a relatively stiff strip or rail. Formed integral with this strip or rail near its ends are outwardly and upwardly projecting hooks 18 which are of such size as to engage the lower edge of the section 12 of plate glass. Formed integral with the rail near its center and projecting outwardly on the side opposite to the hooks 18 is an upwardly presented hook 19 which is of sufficient size to accommodate the body of the shade when the same is rolled upon the roller 14. This hook 19 serves to hold the shade against overwinding upon roller 14.

When my improved shade is not in use, the body 15 is rolled upon the roller 14 and the hook 19 engages the underside and front of said rolled-up body as illustrated by dotted lines in Fig. 3, and thus the entire structure occupies an out-of-the-way position immediately in front of the top portion of frame 11.

To shade the eyes of the driver from the direct rays of the sun or the flare from approaching headlights, the hook 19 is engaged and by exerting a downward pull thereupon, the body of the shade 15 is unwound from roller 14 and drawn downward over the glass section 12. When the lower edge of the shade body reaches the lower edge of said glass section 12, the device is manipulated so as to engage hooks 18 beneath the lower edge of the glass section and thus the shade is retained in position so that it wholly covers said glass section 12 and the latter can now be swung upward or downward to suit conditions.

A device of my improved construction is relatively simple, can be easily and cheaply manufactured, is applicable for use on practically all forms of automobile wind shields, can be readily shifted from one position to another, and when in use is effective in protecting the eyes of a car driver from the direct rays of the sun when the latter is low and also from direct rays of the headlights of approaching vehicles at night.

It will be readily understood that minor changes in the size, form and construction of the various parts of my improved windshield shade may be made and substituted for those herein shown and described, without departing from the spirit of my invention, the scope of which is set forth in the appended claim.

I claim:

The combination with an automobile wind shield, of a roller mounted for operation on the outer face, near the upper edge thereof, of said wind shield, a shade adapted to wind onto said roller, a rail carried by the lower edge of said shade, hooks carried by said rail for engaging the lower edge of the wind shield, and a hook projecting outwardly from the central portion of said rail and adapted to serve as an operating handle and also to serve as a stop to prevent overwinding of the shade on the roller.

In testimony whereof I hereunto affix my signature this 23d day of April, 1918.

T. H. REED.